US011893281B2

(12) United States Patent
Spector et al.

(10) Patent No.: US 11,893,281 B2
(45) Date of Patent: Feb. 6, 2024

(54) EXECUTION CONDITION EMBEDDED IN A COMMAND OR A REQUEST TO STORAGE DEVICE

(71) Applicant: Western Digital Technologies, Inc., San Jose, CA (US)

(72) Inventors: Tomer Spector, Kibbutz Ginegar (IL); Doron Ganon, Kfar Vradim (IL); Eran Arad, Misgav (IL)

(73) Assignee: Western Digital Technologies, Inc., San Jose, CA (US)

(*) Notice: Subject to any disclaimer, the term of this patent is extended or adjusted under 35 U.S.C. 154(b) by 63 days.

(21) Appl. No.: 17/652,815

(22) Filed: Feb. 28, 2022

(65) Prior Publication Data
US 2022/0179587 A1  Jun. 9, 2022

Related U.S. Application Data

(62) Division of application No. 16/438,381, filed on Jun. 11, 2019, now Pat. No. 11,275,527.

(51) Int. Cl.
*G06F 12/00* (2006.01)
*G06F 3/06* (2006.01)
*G06F 13/16* (2006.01)

(52) U.S. Cl.
CPC .......... *G06F 3/0659* (2013.01); *G06F 3/0658* (2013.01); *G06F 3/0679* (2013.01); *G06F 13/1642* (2013.01)

(58) Field of Classification Search
CPC ..... G06F 3/0659; G06F 3/0679; G06F 3/1642
USPC ........................................................ 711/154
See application file for complete search history.

(56) References Cited

U.S. PATENT DOCUMENTS

| | | | |
|---|---|---|---|
| 7,809,900 B2 | 10/2010 | Danilak | |
| 8,171,032 B2* | 5/2012 | Herz | G06Q 30/0207 707/748 |
| 9,377,966 B2 | 6/2016 | Konda et al. | |
| 9,684,459 B2 | 6/2017 | Kondo et al. | |
| 9,690,518 B2 | 6/2017 | Shinaar et al. | |
| 9,754,675 B2 | 9/2017 | Park | |
| 10,037,779 B1* | 7/2018 | Mendonsa | G11B 21/08 |
| 10,095,545 B1* | 10/2018 | Gupta | G06F 9/4881 |
| 10,229,051 B2* | 3/2019 | Hwang | G06F 12/0246 |
| 10,379,943 B2* | 8/2019 | Borlick | G06F 3/0659 |
| 11,275,527 B1* | 3/2022 | Spector | G06F 13/1642 |
| 2001/0052088 A1* | 12/2001 | Donhauser | G05B 19/0428 714/38.13 |
| 2004/0194107 A1* | 9/2004 | Masuoka | G06F 9/542 718/100 |

(Continued)

*Primary Examiner* — Mohamed M Gebril
(74) *Attorney, Agent, or Firm* — PATTERSON + SHERIDAN, LLP; Steven H. VerSteeg (57) ABSTRACT

A storage device includes a non-volatile memory (NVM) and a storage device controller. The storage device controller includes a NVM interface coupled to the NVM and one or more task queues. The storage device controller is operable to pick a task from one or more queues of the storage device. The task is parsed based upon presence of an extra header segment with an execution condition. The task without the extra header segment is sent to execution. Whether the execution condition of the extra header segment of the task is met is determined. The task with the execution condition met is sent to execution. The task with the execution condition unmet is postponed.

20 Claims, 7 Drawing Sheets

(56) References Cited

U.S. PATENT DOCUMENTS

| | | | |
|---|---|---|---|
| 2005/0066138 A1* | 3/2005 | Horn | G06F 9/4881 |
| | | | 711/158 |
| 2006/0242313 A1* | 10/2006 | Le | H04L 67/02 |
| | | | 709/230 |
| 2014/0080428 A1* | 3/2014 | Rhoads | H04W 4/70 |
| | | | 455/88 |
| 2014/0244907 A1* | 8/2014 | Watanabe | G06F 3/0613 |
| | | | 711/103 |
| 2014/0310500 A1* | 10/2014 | Kaplan | G06F 9/30043 |
| | | | 711/206 |
| 2014/0379984 A1* | 12/2014 | Chiu | G06F 3/0689 |
| | | | 711/114 |
| 2016/0210050 A1 | 7/2016 | Hyun et al. | |
| 2016/0378499 A1* | 12/2016 | Burger | G06F 9/3806 |
| | | | 712/234 |
| 2019/0034364 A1* | 1/2019 | Lee | G06F 13/42 |
| 2019/0121570 A1* | 4/2019 | Kim | G06F 3/0688 |
| 2019/0278510 A1* | 9/2019 | Kaynak | G06F 3/0634 |
| 2019/0370066 A1* | 12/2019 | Ma | G06F 11/3062 |
| 2019/0391761 A1* | 12/2019 | Brief | G06F 3/0656 |
| 2020/0092178 A1* | 3/2020 | Nelson | G06Q 10/06316 |
| 2020/0301711 A1* | 9/2020 | Cuffney | G06F 9/3834 |
| 2020/0356280 A1* | 11/2020 | Sela | G11C 11/409 |
| 2021/0034297 A1* | 2/2021 | Park | G06F 12/0246 |

\* cited by examiner

FIG. 1

| COMMAND/REQUEST UPIU ||||
|---|---|---|---|
| 0<br><br>Transaction Type | 1<br><br>Flags | 2<br><br>LUN | 3<br><br>Task Flag |
| 4<br><br>Reserved / Command Set Type | 5<br><br>Query Function / Tsk Manag. Function | 6<br><br>Response | 7<br><br>Status |
| 8<br><br>Total EHS length (≥02h) | 9<br><br>Device Information | 10 (MSB) | 11 (LSB)<br><br>Datage Segment Length (0000h) |
| 12 (MSB) | 13 | 14 | 15 (LSB) |
| Expected Data Transfer Length ||||
| 16 | 17 | 18 | 19 |
| Transaction Specific Fields ||||
| 20 | 21 | 22 | 23 |
| Transaction Specific Fields ||||
| 24 | 25 | 26 | 27 |
| Transaction Specific Fields ||||
| 28 | 29 | 30 | 31 |
| Transaction Specific Fields ||||
| 32<br><br>EHS Type (01h) | 33<br><br>Next EHS Pointer (08h) | 34<br><br>Execution Condition | 35<br><br>Arg 1 |
| 36<br><br>Arg 2 | 37<br><br>Reserved | 38<br><br>Reserved | 39<br><br>Reserved |
| 40<br><br>EHS Type (not 01h) | 41<br><br>Next EHS Pointer (00h) | 42<br><br>Reserved | 43<br><br>Reserved |
| Header E2ECRC (omit if HD=0) ||||

EXECUTION CONDITION EMBEDDED IN A COMMAND OR A REQUEST TO STORAGE DEVICE

CROSS-REFERENCE TO RELATED APPLICATIONS

This application is a divisional of co-pending U.S. patent application Ser. No. 16/438,381, filed Jun. 11, 2019, which is herein incorporated by reference.

BACKGROUND OF THE DISCLOSURE

Field of the Disclosure

Embodiments of the present disclosure generally relate to an execution condition embedded in a command or a request to a storage device.

Description of the Related Art

In storage devices, a host interacts with a storage device by instructing the storage device to perform certain commands. The host can be any computing device, such as a computer, a smart phone, a tablet, an automotive vehicle, a mobile device, etc. The storage device can be a non-volatile memory storage device, such as a solid state drive (SSD). The host provides instructions to the storage device to perform commands, such as writing and reading data to various memory locations in the storage device. The storage device provides feedback to the host regarding completion of the respective commands.

Universal Flash Storage (UFS) is an electronics protocol for high performance and high power efficiency storage devices. In certain instances, a storage device should only execute certain tasks after the storage device is in a certain state. For example, in a write-verify operation, the write task should be completed prior to execution of the verify read task. In another example, in a purge operation, the command queues should be empty prior to issuance of the purge request from the host. In a UFS storage system, having a task execute while the storage device is in a certain state results in poor utilization of the data-path pipeline of the storage device controller. For example, certain tasks may block other tasks from being executed by the storage device or inputted into queues of the storage device.

Therefore, there is a need for improved processes implemented by hardware and/or software in a storage system for commands and requests to be received and executed by a storage device while ensuring execution happens only when the storage device reaches a desired state.

SUMMARY OF THE DISCLOSURE

Embodiments of the present disclosure generally relate to an execution condition embedded in a command or a request to a storage device. In one embodiment, a storage device includes a non-volatile memory (NVM) and a storage device controller. The storage device controller includes a NVM interface coupled to the NVM and one or more task queues. The storage device controller is operable to pick a task from one or more queues of the storage device. The task is parsed based upon presence of an extra header segment with an execution condition. The task without the extra header segment is sent to execution. Whether the execution condition of the extra header segment of the task is met is determined. The task with the execution condition met is sent to execution. The task with the execution condition unmet is postponed.

In another embodiment, a storage device includes a non-volatile memory (NVM) and a storage device controller. The storage device controller includes a NVM interface coupled to the NVM and a universal flash storage interconnect. The storage device controller is operable to receive a first write-verify thread as a first simple write command UPIU and as a first simple read command UPIU. The first simple read command UPIU contains a first extra header segment with a first execution condition of whether the first write command has completed. The storage device controller is further operable to receive a second write-verify thread as a second simple write command UPIU and as a second simple read command UPIU. The second simple read command UPIU contains a second extra header segment with a second execution condition whether the second write command has completed. The storage device controller is operable to execute the first write-verify thread and the second-write verify thread in parallel.

In still another embodiment, a storage device includes a non-volatile memory (NVM) and a storage device controller. The storage device controller includes a NVM interface coupled to the NVM, a plurality of task queues, and a universal flash storage interconnect. The storage device controller is operable to receive a query request UPIU containing a set flag of purge enable and containing a first extra header segment with an execution condition whether the task queues of the storage device are empty. The storage device controller is further operable to receive a command/request UPIU following receiving the query request UPIU. The command/request UPIU contains a second extra header segment with an execution condition whether a purge task enabled by the query request UPIU has completed. The storage device controller is further operable to execute the purge task pursuant to the set flag of purge enable after the task queues of the storage device are empty. The storage device controller is further operable to execute a task of the command/request UPIU after completion of the purge task.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to an execution condition embedded in a command or a request to a storage device. The execution condition can be embedded in a command data packet or a request data packet, such as in a command or request UFS protocol information unit (UPIU) sent to and received by the storage device. An execution condition can be detailed in one or more fields of an extra header segment (EHS) of the UPIU. The execution condition can specify that a certain task or tasks are completed, that certain operations are completed, or that the storage device is in a certain state as a condition for executing the requested task of the command or the request.

Figure 1:
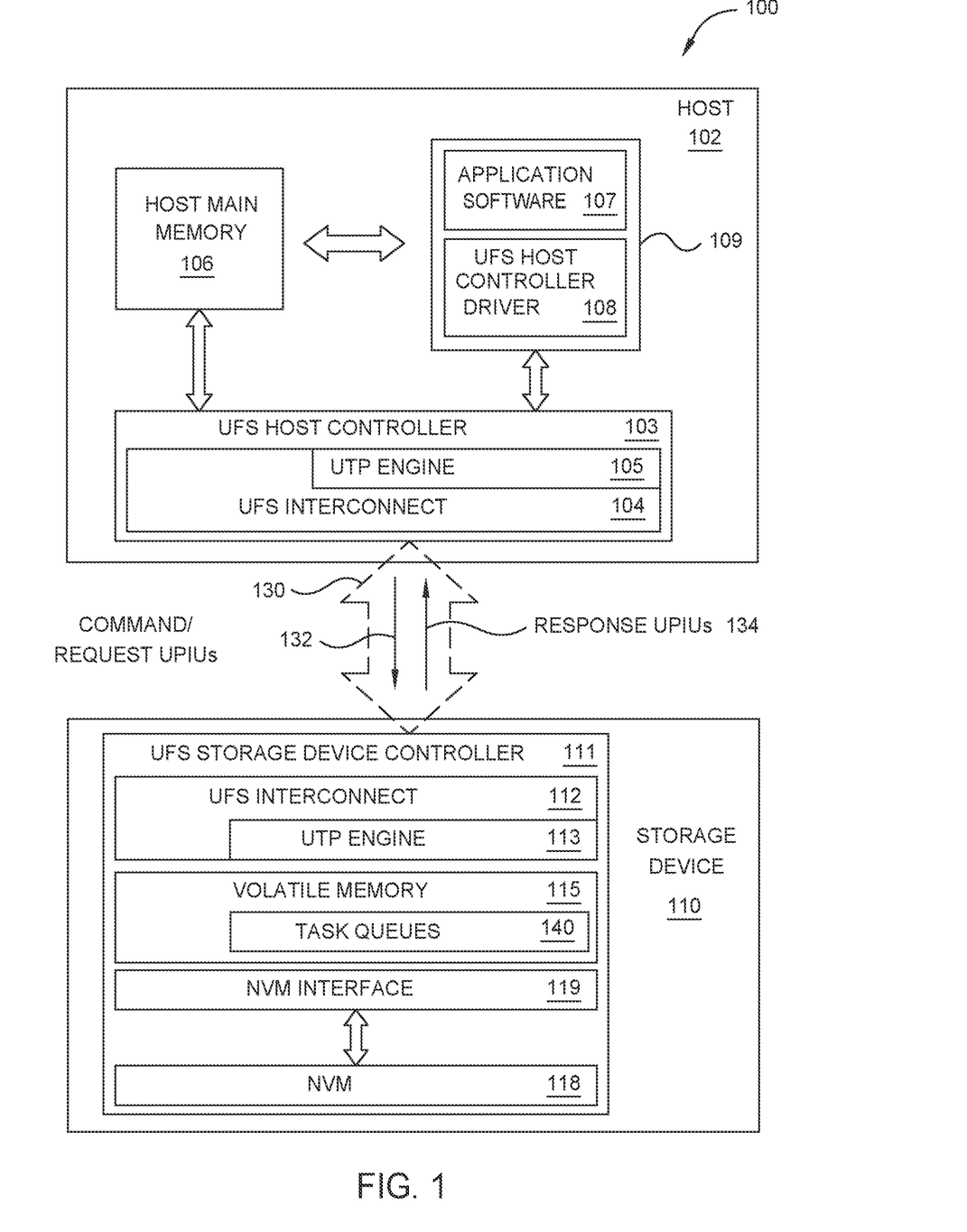
FIG. 1 is a schematic illustration of a UFS storage system 100 according to certain embodiments.

FIG. 1 is a schematic illustration of a UFS storage system 100 according to certain embodiments. The UFS storage system 100 includes a host 102 and a storage device 110. The host 102 includes a host main memory 106, such as DRAM. A software module 109, including an application software 107 and a UFS host controller driver 108, is loaded to the host main memory 106 or other operating memory executed by a host processor. The host 102 includes a UFS host controller 103 having a UFS interconnect layer 104. The host 102 communicates with the storage device 110 through a link 130 established between phy components of the UFS interconnect layer 104 of the host 102 and phy components of a UFS interconnect layer 112 of a UFS storage device controller 111 of the storage device 110. The UFS storage system 100 utilizes the UniPro link interface protocol, in one embodiment.

The UFS storage device controller 111 includes volatile memory 115 that acts as a cache for the storage device 110. Volatile memory does not retain stored data if powered off. Examples of volatile memories include dynamic random access memories (DRAM), static random access memories (SRAM), other forms of volatile memories, and combinations thereof. One or more task queues 140 can be stored in volatile memory 115.

The UFS storage device controller 111 communicates with non-volatile memory (NVM) 118 through channels of a NVM interface 119. NVM 118 is configured for long-term data storage of information and retains information after power on/off cycles. NVM 118 includes one or more arrays of non-volatile flash memory devices, such as multiple flash memory dies. Non-volatile flash memory devices may be configured in a NAND or a NOR configuration. In other embodiments, NVM 118 can be other types of memory devices, such as phase change memories, ReRAM memories, MRAM memories, electrically programmable read only memories (EPROM), electrically erasable programmable read only memories (EEPROM), and other solid-state memories.

A UFS transport protocol (UTP) engine 113 of the UFS storage device controller 111 of the storage device 110 receives commands and data from and delivers responses and data to a UTP engine 105 of the UFS host controller 103. The data packets are group into data structures called UFS protocol information units (UPIUs). The storage device 110 receives command/request UPIUs 132 from the host 102 and sends response UPIUs 134 to the host 102 over the link 130 as well as other types of UPIUs received and sent between the storage device and the host.

UFS host controller 103 utilizes SCSI command architecture to issue commands and requests for tasks to be performed to storage device 110 and/or to the NVM 118 organized as a plurality of logical units (LUNs). For example, each die of the NVM 118 is organized as one or more LUNs. The UFS protocol is intended for non-blocking multi-threaded access to NVM 118.

Other embodiments are not limited to a UFS storage system, but are applicable to a storage system in which the host issues multiple commands/requests for execution by the storage device.

Figure 2:
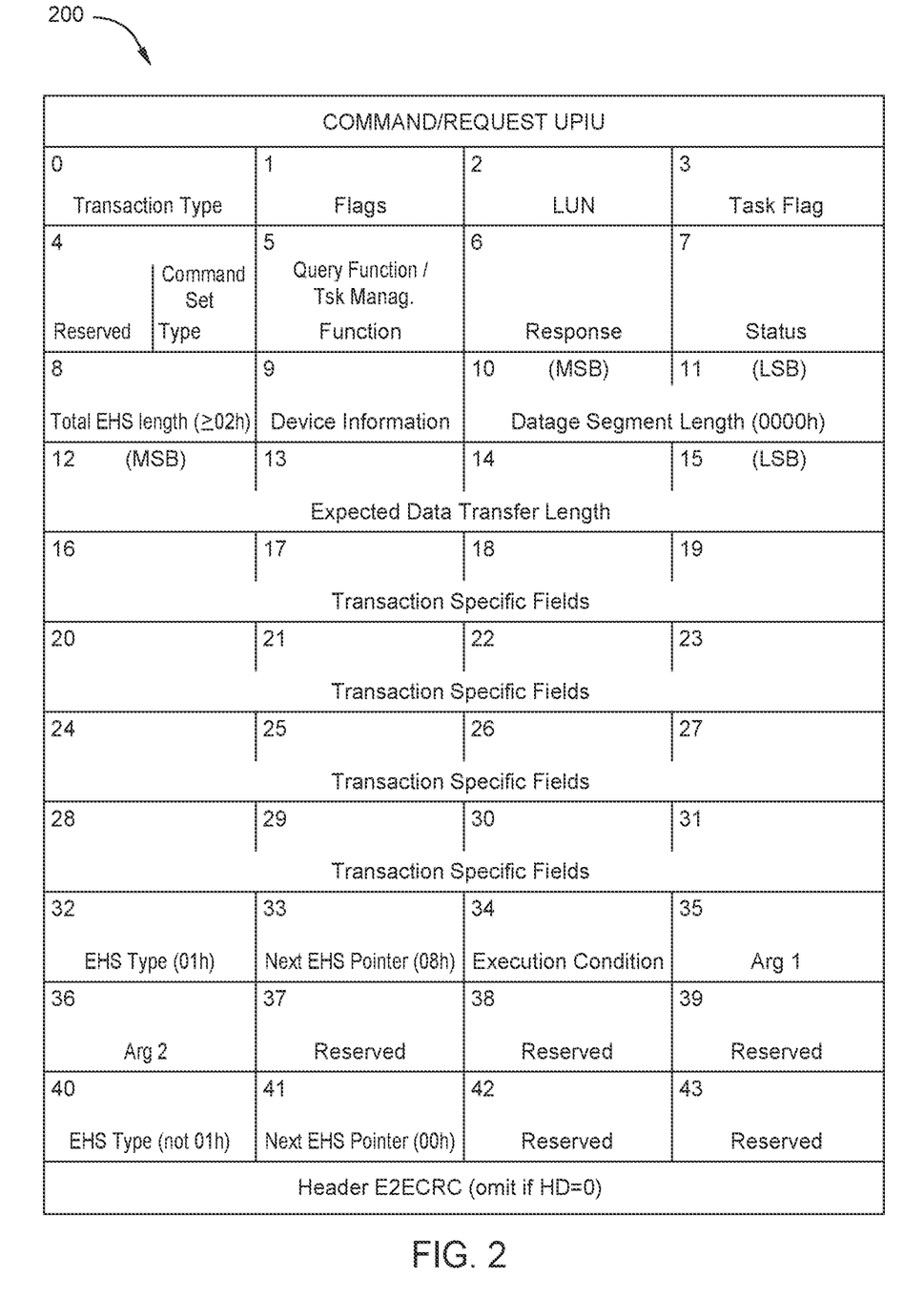
FIG. 2 is a schematic illustration of certain embodiments of a UPIU received by a storage device from a host.

FIG. 2 is a schematic illustration of certain embodiments of a UPIU 200 received by a storage device from a host, such as by storage device 110 from host 102 of FIG. 1 or other suitable storage systems. The UPIU 200 can be any command UPIU, query request UPIU, task management request UPIU, or other suitable UPIUs. The host can generate and send the UPIU 200 to the storage device to request a task to be executed by the storage device. For example, command UPIUs involve write or read tasks to the NVM of the storage device. Query request UPIUs involve modifying, retrieving, setting, or clearing configuration information of the storage device.

A command UPIU contains UPIU header information plus additional fields to specify a command request. For example, Field 0 contains a transaction type. A type code of xx00 0001b indicates a command UPIU transaction type. Field 1 contains flags, such as a flag indicating a task attribute. The task attribute flag indicates whether the task is simple, ordered, or head of queue. A simple task is executed by the storage device in any sequence that does not violate the other two modes. An ordered task is executed by the storage device after all older tasks have completed and before all newer tasks begin to execute. A head of queue task is pushed to the front of a queue ahead of all other tasks.

Field 2 contains a LUN to which a request is targeted. The LUN is generated by the host and maintained by the host and the storage device for all UPIU transactions relating to a single request or task. Field 3 contains a task tag value. The task tag value is a register or variable generated by the host and maintained by the host and the storage device for all UPIU transactions relating to a single request or task. Field 4 contains an initiator ID. The initiator ID is an identity of the host which created the task request. Fields 5-7 are reserved. Field 8 contains a total extra header segment (EHS) length. The total EHS length indicates the size of all EHSs contained with the UPIU. Field 9 is reserved. Fields 10 and 11 contain a data segment length of zero for command requests. Fields 12-15 indicate an expected transfer length. The expected data transfer length represents the number of bytes to be transferred between the host and the storage device as indicated in the command descriptor blocks of fields 16-31.

A query request UPIU contains UPIU header information plus additional fields to specify a query request. For example, Field 0 contains a transaction type. A type code of xx01 0110b indicates a query request UPIU transaction type. Field 1 contains flags, which are typically set to zeros in the case of query request UPIUs. Field 2 is reserved. Field 3 contains a task tag value. The task tag value is a register or variable generated by the host and maintained by the host and the storage device for all UPIU transactions relating to a single request or task. Field 4 is reserved. Field 5 indicates a query function to perform, such as read request and write request to configuration parameters of the storage device. Fields 6-7 are reserved. Field 8 contains a total EHS length. The total EHS length indicates the size of all EHSs contained with the UPIU. Field 9 is reserved. Fields 10 and 11 contain a data segment length. Fields 12-27 are transaction specific fields specific for a specific query function. Fields 28-31 are reserved.

Under UFS, a UPIU, such as UPIU 200 of FIG. 2, comprises a basic header of thirty-two fields (Fields 0-31) as described above. The UPIU can be extended beyond the basic header to include extra header segments and/or data segments. As used herein, the term "extra header segment (EHS)" is defined as an optional header segment that is added to a basic header.

UPIU 200 can contain zero, one, or multiple EHSs starting at byte address 32. If the field contains a zero value, than there are no EHSs. The dependency between the task of the UPIU 200 from the host and the internal state of the storage device can be set by inputting an execution condition in the UPIU 200, such as within an EHS. The execution condition of the EHS indicates the required state of the storage before the task of the UPIU may enter execution on the storage device.

In certain embodiments, an execution condition of the tasks of the UPIU 200 is specified in one EHS in any suitable manner. One example of the execution condition specified in one EHS is as values in an EHS type field and execution condition specifier field of command/request UPIU 200 as shown in FIG. 2. Field 8 indicates a total EHS length in 32-bit units of all EHS elements contained within the UPIU starting at Field 32 for the execution condition plus any optional other EHS element.

Field 32 indicates the EHS type. The EHS type field can indicate the presence of an execution condition. A code, such as a code 01h, can indicate that the EHS is directed to an execution condition specifier. The storage device can review the EHS type field to parse tasks based on whether there is an execution condition associated with the tasks. Another code(s) in Field 32 can indicate that the EHS is directed to other descriptors besides an execution condition.

Field 33 includes a next EHS pointer. The next EHS pointer provides a pointer or an offset to the next EHS. For example, as shown in FIG. 2, a value of 8 indicates a field offset of eight that the next unrelated EHS element starts at Field 40. An offset of zero or a code value of zero can indicate that there is no next EHS. An EHS with an execution condition can be included with another EHS(s) without any execution condition in the same UPIU 200 without interfering with each other. The EHS pointer field can allow implementation of the execution condition of the task along with other enhancement or extensions to UPIU 200.

Field 34 includes execution condition specifier. The execution specifier specifies the execution condition that is required to be met before the task of the UPIU 200 can enter execution by the storage device. TABLE 1 lists examples of execution conditions that can be required by the UPIU 200 for execution of the task. The execution condition can be specified in any suitable manner. In one example, codes specifying the execution conditions are shown in TABLE 1 can be utilized in the execution condition specifier field.

TABLE 1

| Code | Execution Conditions |
| --- | --- |
| 00h | No condition - immediate execution |
| 01h | Queues of all Logical Units are empty |
| 02h | Specific task has ended (task is identified by LUN and TaskTag as specified within Arg1 and Arg2 respectively) |
| 03h | Wait for purge operation to finish |
| 04h | Wait for urgent background operations to finish |
| 05h | Wait for device to cool down below temperature threshold |
| 06h | Wait for refresh operation to finish |
| 07h | Wait for non-urgent background operations to finish |
| 08h | Wait for termination of cache synchronization |
| 09h | Wait for termination of pre-fetch |
| 0Ah | Wait for operations related to real-time clock to finish |
| 0Bh-FFh | Other execution conditions |

Once a task of a UPIU 200 is ready for execution based on its task-attribute (i.e., simple, ordered, head of queue), the storage device determines where the execution condition is met to send the task to execution. For example, a simple task when at the head of the queue would be checked to see if there is an execution condition. If there is no execution condition, the task is sent to execution. If there is an execution condition, the storage device controller would determine whether the execution condition as specified in the EHS is met. If the execution condition is met, the task is sent to execution. If the execution condition is unmet, the task is postponed and another task is reviewed to determine whether to send the task to execution. A postponed task is revisited until its execution condition is met and then sent to execution.

The EHS with the execution condition can further include one or more chain extensions related to the execution condition. For example, the EHS can further include one or more argument fields (i.e. first argument field, second argument field, etc.) depending on the execution condition indicated by the execution condition specifier or can be omitted if not in use. As shown in FIG. 2, fields 35 and 36 include the argument fields. The EHS element is padded with reserved fields, as needed, to align to 32-bit units.

Fields 40 to 43 represent the next EHS element (if any). The next EHS element can be any byte area. Any number of next EHS elements unrelated to the execution condition can be included or omitted. For example, in field 40, an EHS type can be any code other than the code indicating a presence of an execution condition, such as any code other than 01h. There is no more than one execution condition for any given UPIU. Field 41 includes a next EHS pointer. For example, in field 41, a code value of zero indicates that there are no other EHS elements beyond the present EHS element. EHS element with the execution condition, as shown as Fields 32 to 39, can be utilizing in conjunction with any number of next EHS elements, such as shown as Fields 40 to 43, without interfering with each other.

Utilizing the EHS to specify the execution condition is one embodiment. Other embodiments include embedding the execution condition in one or more other fields of the command/request UPIU. For example, the execution condition can be embedded in a reserved field. In another example, the execution condition can be embedded in a field that is typically set to zeros, such as by setting non-zero values.

Figure 3:
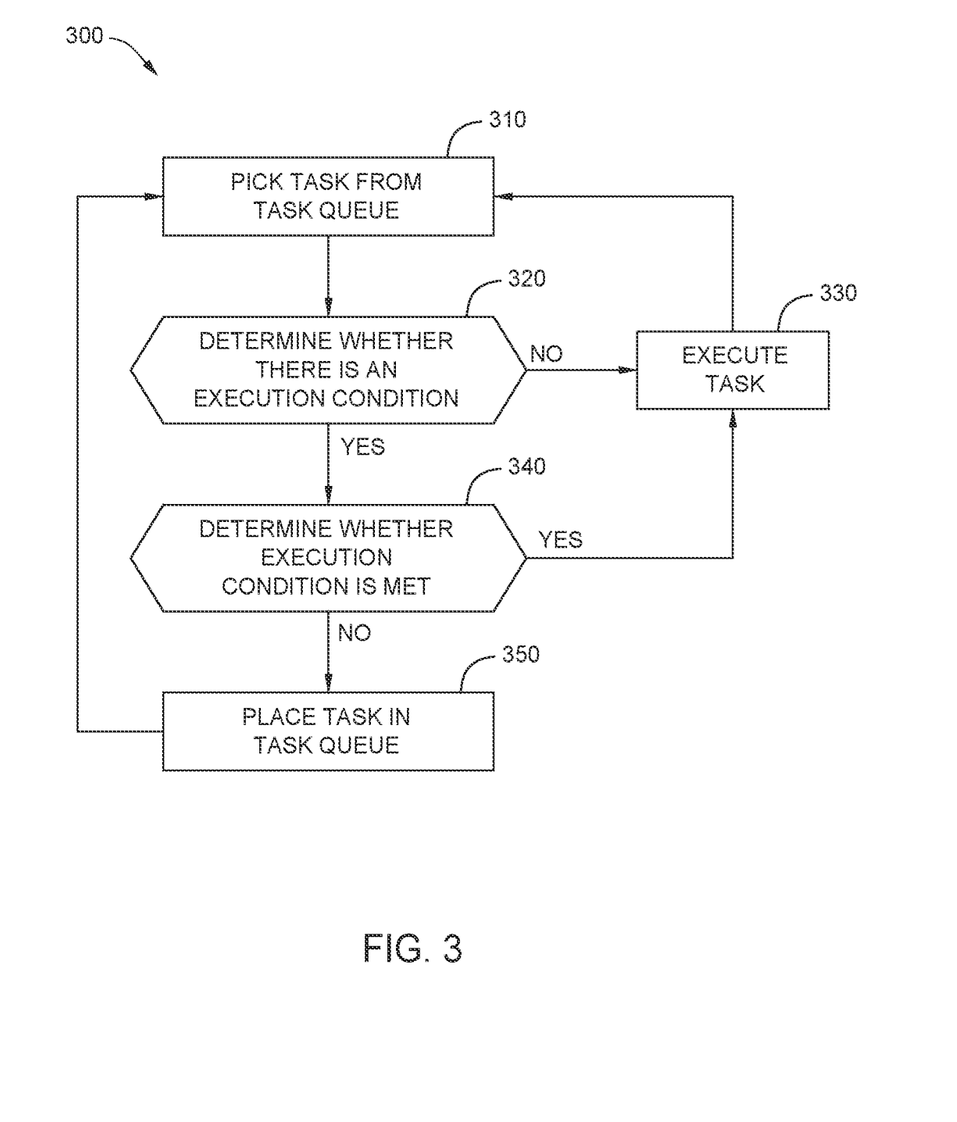
FIG. 3 is a schematic diagram of certain embodiments a process of a storage device controller launching tasks from one or more task queues.

FIG. 3 is a schematic diagram of certain embodiments of a process 300 of a storage device controller, such as a UFS storage device controller 111 of FIG. 1, launching tasks from one or more task queues. The process can be implemented in hardware as state machines propagating values forward, in software, or in a combination of hardware and software.

At block 310 of process 300, a task is picked from one or more task queues of the storage device. For example, the queues can be a regular priority task queue, a high priority task queue, a postponed queue, other suitable queues, and combinations thereof. A task which is at the head of the one or more queues can be picked.

At block 320, the task picked at block 310 is parsed by determining whether there is an execution condition, such as an execution condition in an EHS of a command/request UPIU. For example, the task can be parsed based upon a flag, a code, or non-zero value in the EHS indicating an execution condition. If the task does not have an execution condition, the task proceeds to block 330. If the task does have an execution condition, the task proceeds to block 340.

At block 330, execution of the task is initiated by components of the storage device.

At block 340, the task is parsed by determining whether the execution condition has been met. If the execution condition has been met, the task proceeds to block 330. If the execution condition has not been met, the task proceeds to block 350.

At block 350, the task is placed in the one or more tasks queues. For example, the task can be placed into a postponed task queue, can be placed at a tail of its original task queue, or can be placed into other suitable queues.

After the execution of the task is initiated at block 330 and after placing the task in the task queues at block 350, the process 300 returns to block 310 to pick a next task from the one or more queues. For example, the next task can be one of the tasks from the pool of tasks from the task queues awaiting execution. After a certain time, the postponed task from block 350 is revisited and picked at block 310. The postponed task is processed through blocks 320 and 340 to determine whether the execution condition has been met so that the postponed task can proceed to execution at block 330.

In the process 300, when a task is picked, the storage device executes the task as long as there is no execution condition or the execution condition is met. If the picked task has an execution condition which is not yet met, the task is returned to the pool of tasks of the one or more queues waiting to be executed. The storage device can pick a next task from the pool of tasks in the one or more queues to undergo the process of 300 and can enter execution. The storage device revisits the postponed task to determine if the execution condition is met to send the postponed task to execution in block 330.

Figure 4:
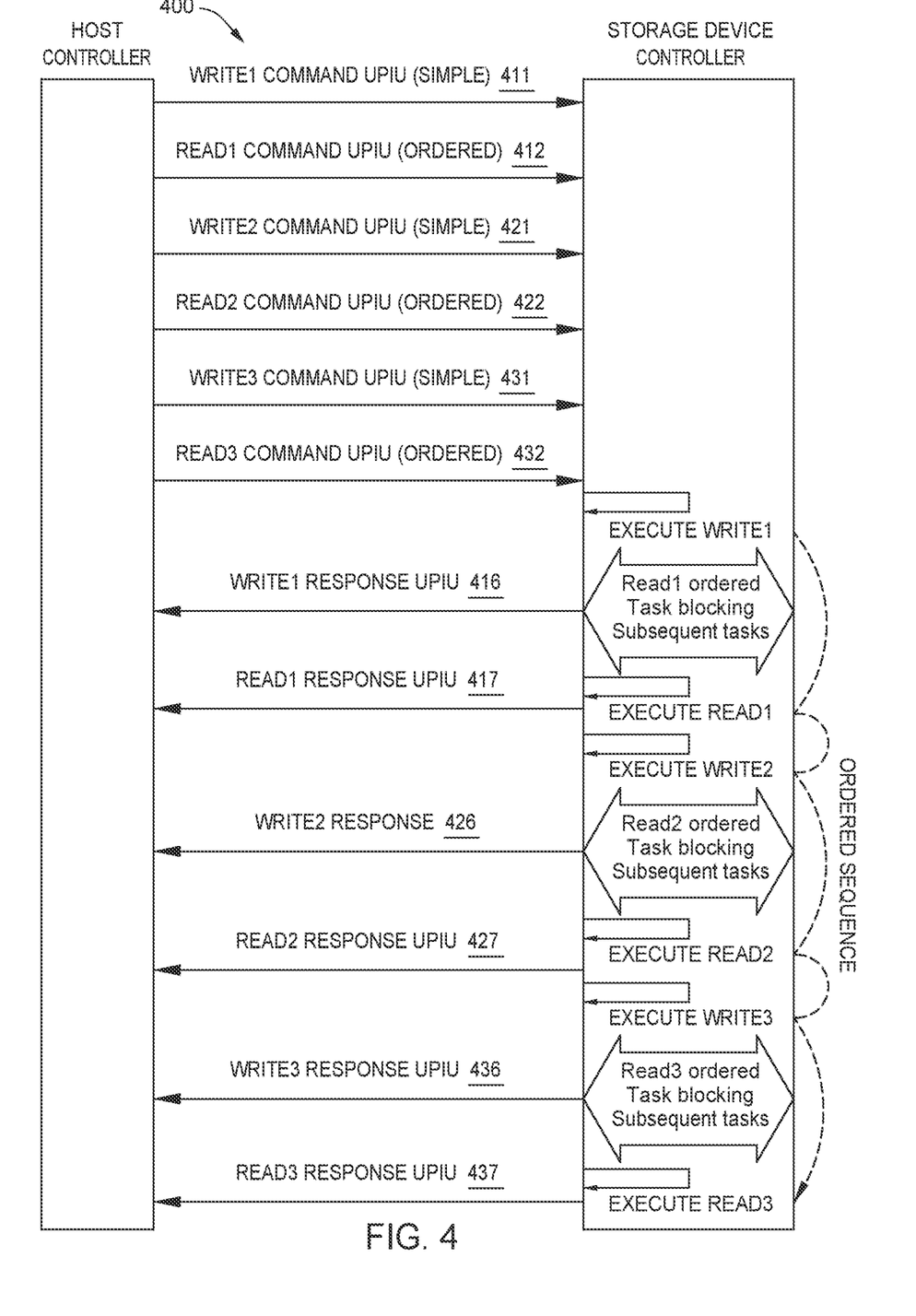
FIG. 4 is a diagram of commands and responses received and sent by the storage device to execute a process of write-verify operations to the storage device utilizing ordered tasks.

FIG. 4 is a diagram of commands and responses received and sent by the storage device, such as command UPIUs and response UPIUs received and sent by storage device 110 from and to host 102 of FIG. 1 or other suitable storage systems, to execute a process 400 of write-verify operations to the storage device utilizing ordered tasks.

Write-verify operations involve verifying that data is correctly written to the storage device. A write-verify operation is issued in UFS as a simple write command followed by an ordered read command. The ordered read command is a blocking task that prevents other subsequent tasks from entering execution until the order read task is completed. The read task is ordered to ensure that its counterpart write task is completed prior to the read task. Three write-verify operations are shown in the process 400.

An application of the host directs a host driver to issue instructions for the host controller to send a first write-verify operation to a storage device controller as a simple first write command UPIU 411 and an ordered first read command UPIU 412 to the storage device, a second write-verify operation as a simple second write command UPIU 421 and an ordered second read command UPIU 422, and a third write-verify operation as a simple third write command UPIU 431 and an ordered third read command UPIU 432.

Since the simple first write command UPIU 411 indicates a simple task, the first write task can be executed without restriction on the storage device. For example, when the task is launched, the task can be immediately executed by the storage device. After the storage device executes the first write task of the simple first write command UPIU 411, the storage device sends a first write response UPIU 416 to the host to indicate successful completion of the first write task.

Since the ordered first read command UPIU 412 indicates an order task, the first read task is restricted from executing until all prior commands have been executed. Therefore, the first read task is blocked from executing until the first write task has executed. After all tasks prior to the first read task have been executed, the first read task is executed and a first read response UPIU 417 is sent from the storage device to the host to indicate successful completion of the first read task. The ordered first read command UPIU 412 also blocks all subsequent tasks until the first read command is executed.

Although the simple second write command UPIU 421 indicates a simple task, the second write task is restricted from executing until the order first read task is executed since the second write task is subsequent to the ordered first read task. After the storage device executes the ordered first read task, the second write task can be executed with the storage device sending a second write response UPIU 426 to the host to indicate successful completion of the second write task.

Since the ordered second read command UPIU 422 indicates an order task, the second read task is restricted until all prior commands have been executed. Therefore, the second read task is blocked from executing until the first write task, the first read task, and the second write task have been executed. After all tasks prior to the task second read task have been executed, the second read task is executed and a second read response UPIU 427 is sent from the storage device to the host to indicate successful completion of the second read task.

Although the simple third write command UPIU 431 indicates a simple task, the third write task is restricted from executing until the order first read task and the ordered second read task are executed since the third write task is subsequent to the ordered first read task and the ordered second read task. After the storage device executes the ordered first read task and the ordered second read task, the third write task can be executed with the storage device sending a third write response UPIU 436 to the host to indicate successful completion of the third write task.

Since the ordered third read command UPIU 432 indicates an order task, the third read task is restricted until all prior commands have been executed. Therefore, the third read task is blocked from executing until the first write task, the first read task, the second write task, the second read task, and the third write task have been executed. After all tasks prior to the third read task have been executed, the third read task is executed and a third read response UPIU 437 is sent from the storage device to the host to indicate successful completion of the third read task.

The first read task, the second read task, and the third read tasks are ordered tasks and are blocked from executing until respective prior tasks are executed. Respective subsequent tasks are also blocked from executing until the ordered first read task, the ordered second read task, and the order third read task are executed. Due to the ordered tasks, execution of the first write, the first read, the second write, the second read, the third write, and the third read executes sequentially. Although the second write task is a simple task, the second write task must wait for completion of the ordered first read. Although the third write task is a simple task, the third write task must wait for completion of the ordered first read and the ordered second read. The ordered tasks prevent the storage device controller from executing tasks in a parallel and/or in other series even though the tasks are directed to unrelated data.

Fused commands are similarly problematic to ordered commands. A fused command fuses two tasks when executed no other tasks can be performed in between. Fused commands are limited to fusing together only two specific tasks (write and compare) using the same logical block address ranges. Ordered and fused commands prevent other tasks from being executed in parallel.

Figure 5:
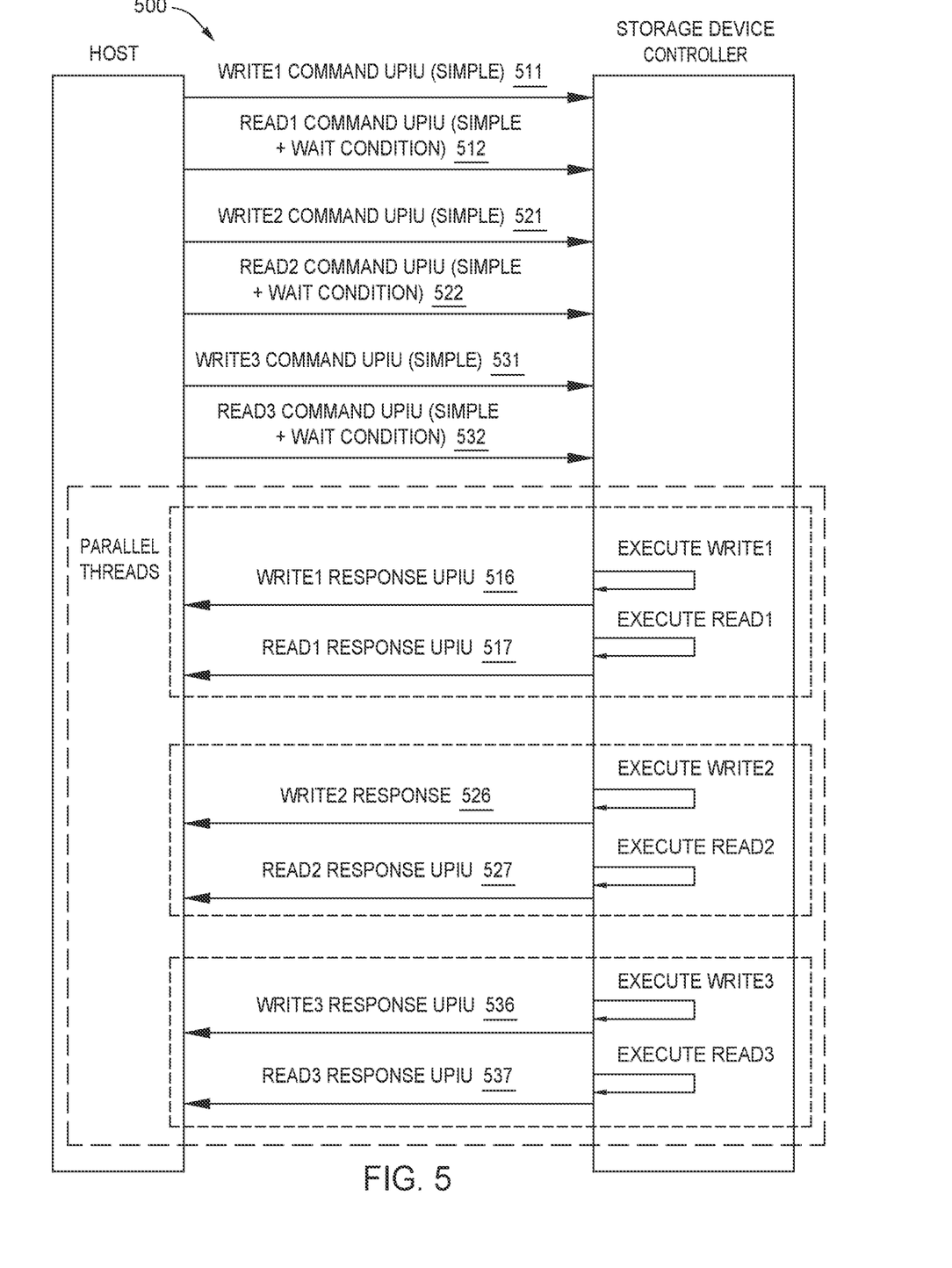
FIG. 5 is a diagram of certain embodiments of commands and responses received and sent by the storage device to execute certain embodiments of a process of write-verify operations to the storage device utilizing execution conditions.

FIG. 5 is a diagram of certain embodiments of commands and responses received and sent by the storage device, such as query command UPIUs and response UPIUs received and sent by storage device 110 from and to host 102 of FIG. 1 or other suitable storage systems, to execute certain embodiments of a process 500 of write-verify operations to the storage device utilizing execution conditions.

In certain embodiments of the process 500, a write-verify operation is issued as a simple write command followed by a simple read command with an execution condition, such as the execution condition embedded in an EHS of a command UPIU described in reference to FIG. 2. Three write-verify operations are shown in the process 500. The process 500 can be implemented by the storage device with the process of 300 of FIG. 3.

An application of the host directs a host driver to issue instructions for the host controller to send a first write-verify operation to a storage device controller as a simple first write command UPIU 511 and a simple first read command UPIU 512 with an execution condition, a second write-verify operation as a simple second write command UPIU 521 and a simple second read command UPIU 522 with an execution condition, and a third write-verify operation as a simple third write command UPIU 531 and a simple third read command UPIU 532 with an execution condition. The execution condition of the first read task is whether its counterpart first write task has completed. The execution condition of the second read task is whether its counterpart second write task has completed. The execution condition of the third read task is whether its counterpart third write task has completed.

Since the simple first write command UPIU 511 indicates a simple task, the first write task can be executed without restriction on the storage device. When the task is parsed for execution, the task can be immediately executed by the storage device when the storage device is ready since there is no execution condition in the simple first write command UPIU 511. After the storage device executes the first write task, the storage device sends a first write response UPIU 516 to the host to indicate successful completion of the first write task.

Since the simple first read command UPIU 512 with an execution condition indicates a simple task, the first read task can be executed without restriction on the storage device as long as the execution condition is met. The execution condition is that the first write task is completed. When the first read task is parsed for execution, the first read task can be executed by the storage device if the first write task has completed or can be postponed by the storage device if the first write task has not completed. The first read task is postponed until parsed for execution when the execution condition is met. After the storage device executes the first read task, the storage device sends a first read response UPIU 517 to the host to indicate successful completion of the first read task.

Since the simple second write command UPIU 521 indicates a simple task, the second write task can be executed without restriction on the storage device. When the task is parsed for execution, the task can be immediately executed by the storage device since when the storage device is ready since there is no execution condition in the simple second write command UPIU 521. After the storage device executes the second write task, the storage device sends a second write response UPIU 526 to the host to indicate successful completion of the second write task.

Since the simple second read command UPIU 522 with an execution condition indicates a simple task, the second read task can be executed without restriction on the storage device as long as the execution condition is met. The execution condition is that the second write task is completed. When the second read task is parsed for execution, the second read task can be executed by the storage device if the second write task has completed or can be postponed by the storage device if the second write task has not completed. The second read task is postponed until parsed for execution when the execution condition is met. After the storage device executes the second read task, the storage device sends a second read response UPIU 527 to the host to indicate successful completion of the second read task.

Since the simple third write command UPIU 531 indicates a simple task, the third write task can be executed without restriction on the storage device. When the task is parsed for execution, the task can be immediately executed by the storage device since there is no execution condition in the simple third write command UPIU 531. After the storage device executes the third write task, the storage device sends a third write response UPIU 536 to the host to indicate successful completion of the third write task.

Since the simple third read command UPIU 532 with an execution condition indicates a simple task, the third read task can be executed without restriction on the storage device as long as the execution condition is met. The execution condition is that the third write task is completed. When the third read task is parsed for execution, the third read task can be executed by the storage device if the third write task has completed or can be postponed by the storage device if the third write task has not completed. The third read task is postponed until parsed for execution when the execution condition is met. After the storage device executes the third read task, the storage device sends a third read response UPIU 537 to the host to indicate successful completion of the third read task.

The read command UPIUs 512, 522, 532 indicate simple tasks with execution conditions to wait for their counterpart write tasks. The simple read tasks do not block any other tasks. The multiple write-read pairs of the write-verify operation can be executed as parallel threads where each pair executes with the write task completed before its counterpart read task enters execution. The storage device can execute each write task of the parallel threads in any arrangement (in parallel in whole or in part, in any series, and combinations thereof). The storage device can execute each read task of the parallel threads in any time (in parallel in whole or in part, in any series, and combinations thereof) as long as the counterpart write task is completed. Tasks subsequent to the read tasks can be executed prior to each read task since each read task is a simple task and not an ordered task. In addition, one or more tasks can be performed between each write task and its counterpart read task since the tasks are not fused tasks.

Figure 6:
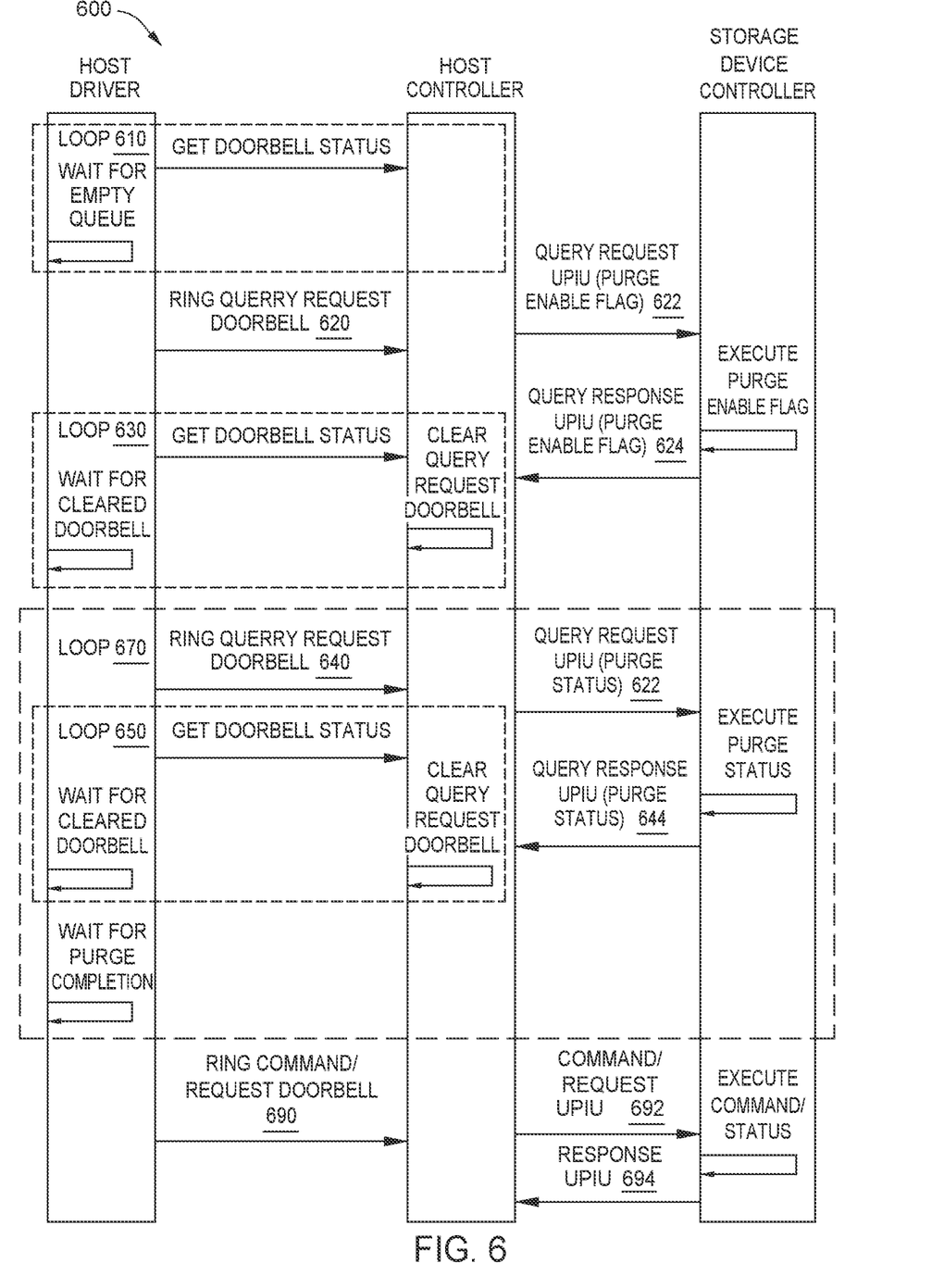
FIG. 6 is a diagram of signals sent between a host controller driver, a host controller, and a storage device to execute a process of a purge operation to a storage device.

FIG. 6 is a diagram of signals sent between a host controller driver, a host controller, and a storage device controller, such as host controller driver 108, host controller 103, and storage device controller 111 of FIG. 1 or other suitable storage systems, to execute a process 600 of a purge operation to a storage device.

A purge operation is one example of an operation that must wait commands queues to be empty. A purge operation is a background operation in the storage device when the storage device is idle. Once the purge operation is initiated, any commands to a UFS storage device will fail during execution of the purge operation. A UFS storage device does not push any notifications that the purge operation has completed. A UFS host needs to request a status of the purge operation from the UFS storage device. The UFS storage device will respond with the current status of the purge operation. For the UFS host to determine that the storage device has completed the purge operation, the UFS host must continuously poll the storage device with status requests until a response of purge completion is sent by the storage device.

For an application of the host to direct the host driver to issue a purge operation to the storage device, a UFS host driver must wait for the UFS command queues of the host to be empty prior to issuing a purge request. The host driver polls the host controller for any active doorbells of uncompleted or uncleared commands. The host driver is in a first loop 610 polling the host controller until all the command doorbells have been cleared and the command queues are empty.

After the host command queues are empty, the host driver rings a query request doorbell 620 for the host controller to send a query request UPIU 622 with a purge enable flag to the storage device controller. The storage device controller sends a query response UPIU 624 to the host controller indicating successful completion of enabling the purge flag. To ensure that the purge of the storage device has been activated, the host driver polls the host controller to determine if the query request to enable the purge flag has been completed. The host driver is in a second loop 630 polling the host controller until the doorbell of the query request to enable the purge flag has been cleared.

Before the application of the host directs the host driver to issue a separate command or request to the storage device, the purge operation must be completed under the UFS protocol. After the doorbell of the query request to enable the purge flag has been cleared, the host driver rings a query request doorbell 640 for the host controller to send a query request UPIU 642 with a purge status request to the storage device controller. The storage device controller sends a query response UPIU 644 to the host controller indicating the current status of the purge operation. The host driver is in a third loop 650 polling the host controller until the doorbell of the query request of purge status has been cleared. Furthermore, the host driver is in a fourth loop 670 polling the host controller until a response of successful completion status of the purge operation is sent to the host. The purge operation by storage device begins from when the purge flag is enabled and finishes at the end of the fourth loop 670.

After the four loops 610, 630, 650, 670, the host driver can issue another command or request to the host by ringing command/request doorbell 690. The host controller can send any associated command/request UPIU 692 to the storage device controller. The storage device controller can send any associated response UPIU 694 on completion of the associated command/request to the host controller.

As shown in process 600, the host driver must wait for the storage device queues to be empty prior to issuing a purge operation. Furthermore, the host driver must poll the storage device for completion of the purge operation prior to issuing a next command/request. Therefore, commands and requests subsequent to the purge task are delayed from entering queues of the storage device.

Figure 7:
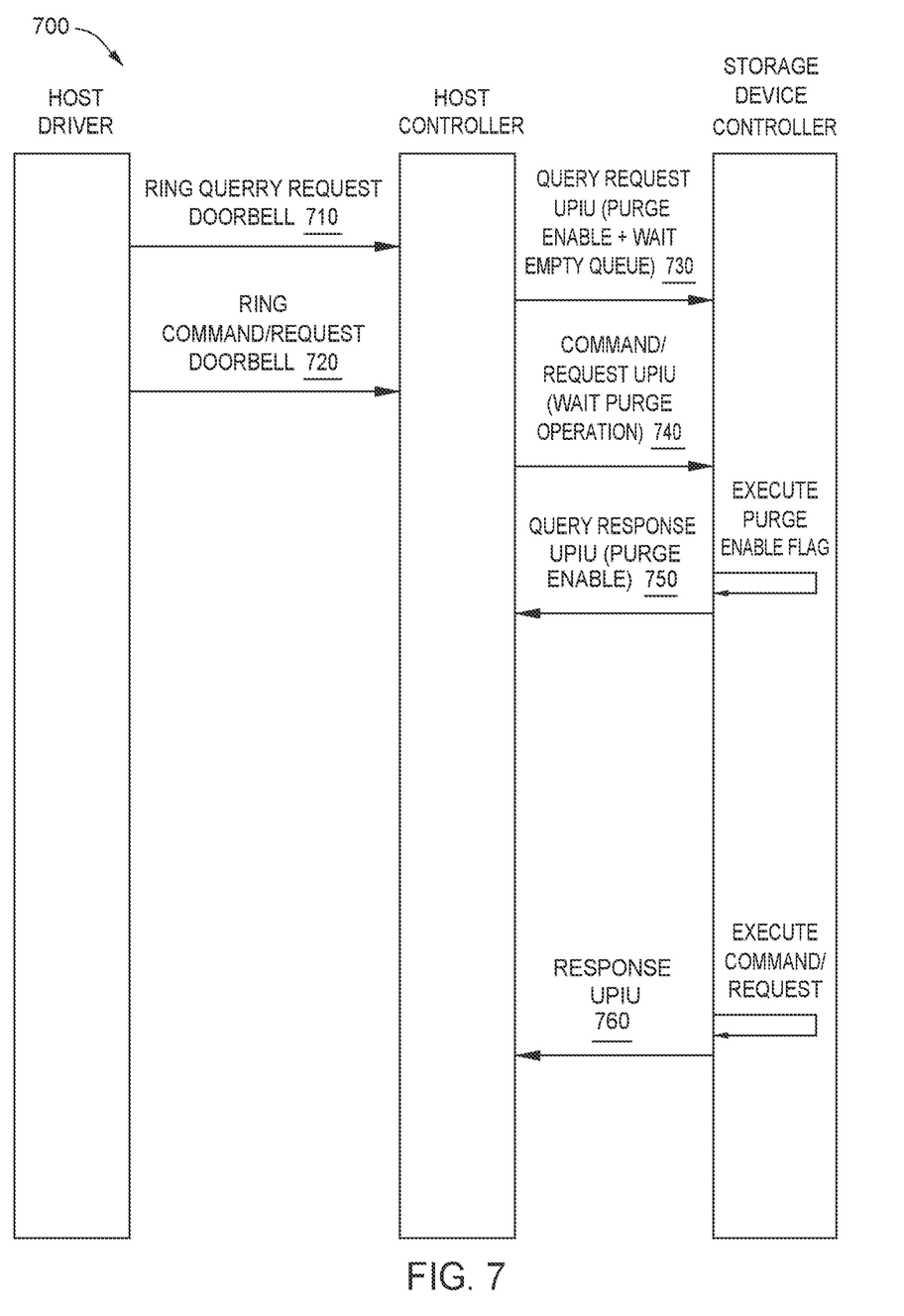
FIG. 7 is a diagram of signals sent between a host controller driver, a host controller, and a storage device to execute certain embodiments of a process of a purge operation to the storage device utilizing an execution condition.

FIG. 7 is a diagram of signals sent between a host controller driver, a host controller, and a storage device controller, such as host controller driver 108, host controller 103, and storage device controller 111 of FIG. 1 or other suitable storage systems, to execute certain embodiments of a process 700 of a purge operation to the storage device utilizing an execution condition.

In certain embodiments of the process 700, a purge operation is issued as a query request with an execution condition, such as the execution condition embedded in an EHS of a query request UPIU described in reference to FIG. 2. After the purge operation is issued, a command or request operation is issued with an execution condition. The process 700 can be implemented by the storage device with the process of 300 of FIG. 3.

An application of the host directs the host driver to issue a request that the storage device conduct a purge operation with an execution condition to wait for the command queues to be empty before executing the purge operation. Since execution condition specifies to wait for the command queues to be empty, the host driver does not need to poll the host controller to ensure that the command queues are empty. The host driver can issue the purge request with the execution condition to wait for the empty queues even if the queues are not yet empty. After issuing the purge request, the host driver can ring a command/request doorbell to issue any next command or request with an execution condition to the storage device. The execution condition of the next command or request is to wait for completion of the purge operation. The next command/request can be issued without polling the host controller to send requests to the storage device controller on whether the purge operation has completed.

After the host driver issues the purge request from doorbell 710, the host controller sends a query request UPIU 730 to enable the purge flag with an execution condition to wait for the command queues to be empty. After the host driver issues a next command/request from doorbell 720, the host controller sends a command/request UPIU 740 with the next command/request with an execution condition to wait for the purge task to be completed.

The purge operation by storage device begins from when the purge flag is enabled and is in progress when the query response UPIU 750 to the purge enable query request is sent from the storage device controller. After a time period after the query response UPIU 750 when the purge operation is completed, the storage device automatically executes the command/request from command/request UPIU 740 since the execution condition of the command/request UPIU 740 is met.

Utilizing an execution condition with the purge task eliminates the loop of waiting for the command queues to be empty before issuing the purge task. Utilizing an execution condition with the next command/request task eliminates the loops of waiting for completion of the purge task before issuing the next command/request. Therefore, utilization of the execution condition in the purge task and/or in the next command/request increases the performance and/or efficiency of the storage device since tasks can be queue into the storage device without waiting for the storage device to arrive at a certain state. In addition, the process 700 reduces the traffic of unnecessary status requests and status responses of whether the purge task has completed.

As shown by the processes 300, 500, and 700 of FIGS. 3, 5, and 7, a host can embed an execution condition in a command/request to the storage device. The execution condition is embedded in a command/request UPIU sent to and received by the storage device, such as in an EHS of the command/request UPIU. The execution condition can specify that a certain task or tasks are completed, that certain operations are completed, or that the storage device is in a certain state as a condition for executing the requested task of the command/request UPIU.

As shown in process 500, utilizing an embedded execution condition enables execution of multiple threads in parallel, such as parallel execution of multiple write-verify operations in comparison to using ordered read commands. Instead of ordered commands, simple commands are used with an execution condition. The embedded execution condition in a read command to wait for completion of its counterpart write task removes the blocking nature of an ordered read command blocking execution of other unrelated subsequent tasks. Therefore, the storage device can execute each write-read thread in any manner regardless of what happens in the other write-read threads. One read tasks does not need to wait for execution of another read task. Utilizing an embedded execution enables the storage device to execute multiple threads in parallel instead of in a particular sequence. The tasks of the simple commands can be executed by the storage device in any arrangement (in parallel in whole or in part, in any series, and combinations thereof) as long as the associated execution conditions, if any, are met. Furthermore, one or more other tasks can be executed between any two counterpart tasks. In addition, the embedded execution condition can be used to specify a certain sequence, if desired.

As shown in process 700, utilizing an embedded execution condition enables issuing of a command or a task without waiting for command queues to be empty, such as issuing a purge request without waiting for command queues to be empty. Issuing of a purge request with an embedded execution condition to wait for the command queues to be empty removes the need for the host driver to poll the host controller whether there are remaining tasks in the command queue. In addition, utilizing an embedded execution condition enables issuing of a command or a request without having to wait for a purge operation to be completed. Issuing a next command or request with an embedded execution condition to wait for the purge task to complete removes the need for status responses from the storage device to ensure that the purge task has completed. One or more next commands and requests can be loaded to queues of the storage device without waiting for completion of a purge task.

Process 500 of FIG. 5 and process 700 of FIG. 7 are two specific examples of using one or more execution conditions of TABLE 1 for one or more operations. Many other examples of using execution conditions of TABLE 1 are applicable. For example, the host can send tasks with the execution condition to wait for completion of urgent background operations to the storage device. Sending tasks without the execution condition to the storage device can stop the urgent background operations since the added tasks removes the storage device form idle so that the storage device can execute the added tasks. If urgent background operations are continuously stopped or delayed, the storage device lifetime and performance may be reduced. Sending tasks with the execution condition of wait for completion of urgent background operations can extend the lifetime and performance of a storage device.

A storage device can use embedded execution conditions to increase performance and/or efficiency of the storage device. For example, embedded execution conditions increases parallel execution of tasks or threaded operations involving any tasks and involving any logical block address ranges. For example, embedded execution reduces polling by the host and sending query responses. The execution condition can be embedded as an EHS of a command or request UPIU and can be applied to the various execution conditions listed in TABLE 1.

In one embodiment, a storage device includes a non-volatile memory (NVM) and a storage device controller. The storage device controller includes a NVM interface coupled to the NVM and one or more task queues. The storage device controller is operable to pick a task from one or more queues of the storage device. The task is parsed based upon presence of an extra header segment with an execution condition. The task without the extra header segment is sent to execution. Whether the execution condition of the extra header segment of the task is met is determined. The task with the execution condition met is sent to execution. The task with the execution condition unmet is postponed.

In another embodiment, a storage device includes a non-volatile memory (NVM) and a storage device controller. The storage device controller includes a NVM interface coupled to the NVM and a universal flash storage interconnect. The storage device controller is operable to receive a first write-verify thread as a first simple write command UPIU and as a first simple read command UPIU. The first simple read command UPIU contains a first extra header segment with a first execution condition of whether the first write command has completed. The storage device controller is further operable to receive a second write-verify thread as a second simple write command UPIU and as a second simple read command UPIU. The second simple read command UPIU contains a second extra header segment with a second execution condition whether the second write command has completed. The storage device controller is operable to execute the first write-verify thread and the second-write verify thread in parallel.

In still another embodiment, a storage device includes a non-volatile memory (NVM) and a storage device controller. The storage device controller includes a NVM interface coupled to the NVM, a plurality of task queues, and a universal flash storage interconnect. The storage device controller is operable to receive a query request UPIU containing a set flag of purge enable and containing a first extra header segment with an execution condition whether the task queues of the storage device are empty. The storage device controller is further operable to receive a command/request UPIU following receiving the query request UPIU. The command/request UPIU contains a second extra header segment with an execution condition whether a purge task enabled by the query request UPIU has completed. The storage device controller is further operable to execute the purge task pursuant to the set flag of purge enable after the task queues of the storage device are empty. The storage device controller is further operable to execute a task of the command/request UPIU after completion of the purge task.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
a non-volatile memory (NVM); and
a storage device controller, comprising:
a NVM interface coupled to the NVM, and
a universal flash storage interconnect;
the storage device controller configured to:
receive a first write-verify thread as a first simple write command Universal Flash Storage protocol information unit (UPIU) and as a first simple read command UPIU with a first extra header segment with a first execution condition whether a first write command of the first simple write command UPIU has completed;
receive a second write-verify thread as a second simple write command UPIU and as a second simple read command UPIU with a second extra header segment with a second execution condition whether a second write command of the second simple write command UPIU is completed; and
execute the first write-verify thread and the second write-verify thread in parallel.

2. The storage device of claim 1, wherein the first simple read command UPIU and the second read command UPIU do not block other tasks from execution by the storage device.

3. The storage device of claim 1, wherein one or more tasks is performed between a first simple write task of the first simple write command UPIU and a first simple read task of the first simple read command UPIU.

4. The storage device of claim 1, wherein the first extra header segment of the first simple read command UPIU and the second extra header segment of the second simple read command UPIU each further contains an extra header type code indicating an execution condition specifier.

5. The storage device of claim 1, wherein the first extra header segment of the first simple read command UPIU further contains a pointer to any next extra header segment.

6. The storage device of claim 1, wherein the storage device controller is configured to send a first write response UPIU to a host indicating successful completion of the first simple write command.

7. The storage device of claim 6, wherein the storage device controller is configured to send a first read response UPIU to the host indicating successful completion of the first simple read command.

8. The storage device of claim 1, wherein the storage device controller is further configured to receive a query request UPIU with a purge enable flag.

9. The storage device of claim 8, wherein the storage device controller is further configured to send a query response UPIU to a host indicating a current status of enabling the purge flag.

10. The storage device of claim 9, wherein the storage device controller is further configured to send a query response UPIU to the host indicating successful completion of enabling the purge flag.

11. A storage device, comprising:
a non-volatile memory (NVM); and
a storage device controller, comprising:
a NVM interface coupled to the NVM,
a plurality of task queues, and
a universal flash storage interconnect;
the storage device controller configured to:
receive a query request UPIU containing a set flag of purge enable and containing a first extra header segment with an execution condition of whether the task queues of the storage device are empty;
receive a command/request UPIU following receiving the query request UPIU, the command/request UPIU containing a second extra header segment with an execution condition whether a purge task enabled by the query request UPIU has completed;
execute the purge task pursuant to the set flag of purge enable after the task queues of the storage device are empty; and
execute a task of the command/request UPIU after completion of the purge task.

12. The storage device of claim 11, wherein the query request UPIU is received when the task queues contains one or more tasks.

13. The storage device of claim 11, wherein the command/request UPIU is received during execution of the purge task.

14. The storage device of claim 11, wherein the command/request UPIU is received without receiving any status request of the purge task from a host.

15. The storage device of claim 11, wherein the first extra header segment of the query request UPIU further contains a pointer to any next extra header segment.

16. The storage device of claim 11, wherein the storage device controller is configured to select a task from plurality of task queues.

17. The storage device of claim 16, wherein the storage device controller is configured to parse the selected task to determine whether there is an execution condition.

18. The storage device of claim 17, wherein the storage device controller is configured to parse the task to determine whether the execution condition has been met.

19. The storage device of claim 18, wherein the storage device controller is configured to execute the task upon determining that the execution condition has been met.

20. The storage device of claim 18, wherein the storage device controller is configured to place the task in a task queue upon determining that the execution condition has not been met.

\* \* \* \* \*